(12) United States Patent
Schneider et al.

(10) Patent No.: US 12,480,412 B2
(45) Date of Patent: Nov. 25, 2025

(54) INSERTION OF CERAMIC MEMBERS FOR GAS PATH ENDWALL CONTOURING

(71) Applicant: RTX Corporation, Farmington, CT (US)

(72) Inventors: Alex J. Schneider, Manchester, CT (US); Peter Hansen Wilkins, Manchester, CT (US); Howard J. Liles, Newington, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/444,067

(22) Filed: Feb. 16, 2024

(65) Prior Publication Data

US 2025/0264028 A1 Aug. 21, 2025

(51) Int. Cl.
| | | |
|---|---|---|
| *F01D 5/28* | (2006.01) | |
| *F01D 5/14* | (2006.01) | |
| *F01D 9/04* | (2006.01) | |
| *F01D 11/00* | (2006.01) | |
| *F01D 25/00* | (2006.01) | |

(52) U.S. Cl.
CPC ............ *F01D 5/284* (2013.01); *F01D 5/143* (2013.01); *F01D 9/041* (2013.01); *F01D 11/008* (2013.01); *F01D 25/005* (2013.01); *F05D 2220/32* (2013.01); *F05D 2240/12* (2013.01); *F05D 2240/30* (2013.01); *F05D 2240/80* (2013.01); *F05D 2300/20* (2013.01)

(58) Field of Classification Search
CPC .......... F01D 5/284; F01D 5/143; F01D 9/041; F01D 11/008; F01D 25/005; F05D 2240/80; F05D 2220/32; F05D 2240/12; F05D 2240/30
See application file for complete search history.

(56) References Cited

U.S. PATENT DOCUMENTS

| | | |
|---|---|---|
| 7,600,979 B2 | 10/2009 | Steibel et al. |
| 7,887,297 B2 | 2/2011 | Allen-Bradley et al. |
| 8,511,978 B2 | 8/2013 | Allen-Bradley et al. |
| 8,647,066 B2 * | 2/2014 | Guimbard ............... F01D 5/143 416/193 A |
| 9,085,985 B2 * | 7/2015 | Barr ........................ F01D 5/145 |
| 9,188,014 B2 | 11/2015 | Fachat et al. |
| 9,194,240 B2 | 11/2015 | Blanchard et al. |
| 10,859,268 B2 * | 12/2020 | Whittle .................... F23R 3/16 |
| 11,149,561 B2 | 10/2021 | Whittle et al. |
| 11,415,013 B1 * | 8/2022 | Whittle ................... F01D 9/041 |
| 11,643,948 B2 * | 5/2023 | Clark .................... C04B 35/565 156/60 |
| 11,739,644 B2 | 8/2023 | Gustafson et al. |

(Continued)

OTHER PUBLICATIONS

Extended European Search Report for EP Application No. 25158103.9, dated Jul. 24, 2025, 10 pages.

Primary Examiner — Andrew J Marien
(74) Attorney, Agent, or Firm — Kinney & Lange, P.A.

(57) ABSTRACT

An endwall assembly for an airfoil of a gas turbine engine includes a first fiber layer, a second fiber layer forming a gas path surface, and a contoured insert disposed between the first and second fiber layers, wherein the second fiber layer conforms to a contoured surface of the contoured insert such that the contoured surface defines a geometry of the gas path surface.

9 Claims, 6 Drawing Sheets

(56) References Cited

U.S. PATENT DOCUMENTS

| | | | |
|---|---|---|---|
| 2010/0172749 A1* | 7/2010 | Mitsuhashi | F01D 5/143 |
| | | | 415/193 |
| 2011/0044818 A1* | 2/2011 | Kuhne | F01D 5/143 |
| | | | 416/212 A |
| 2012/0195766 A1 | 8/2012 | Cohin et al. | |
| 2014/0212292 A1* | 7/2014 | Xu | F01D 5/143 |
| | | | 29/889 |
| 2017/0218769 A1* | 8/2017 | Venugopal | F01D 5/145 |
| 2017/0298748 A1* | 10/2017 | Vetters | F01D 25/246 |
| 2018/0230823 A1* | 8/2018 | Sippel | C04B 35/565 |
| 2022/0154587 A1* | 5/2022 | Sobanski | F01D 9/041 |

* cited by examiner

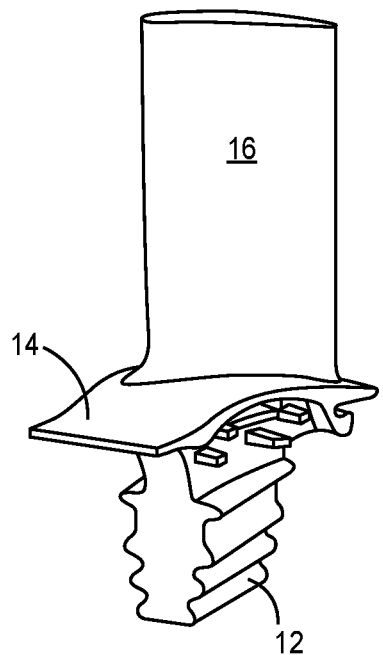
FIG. 1
(PRIOR ART)
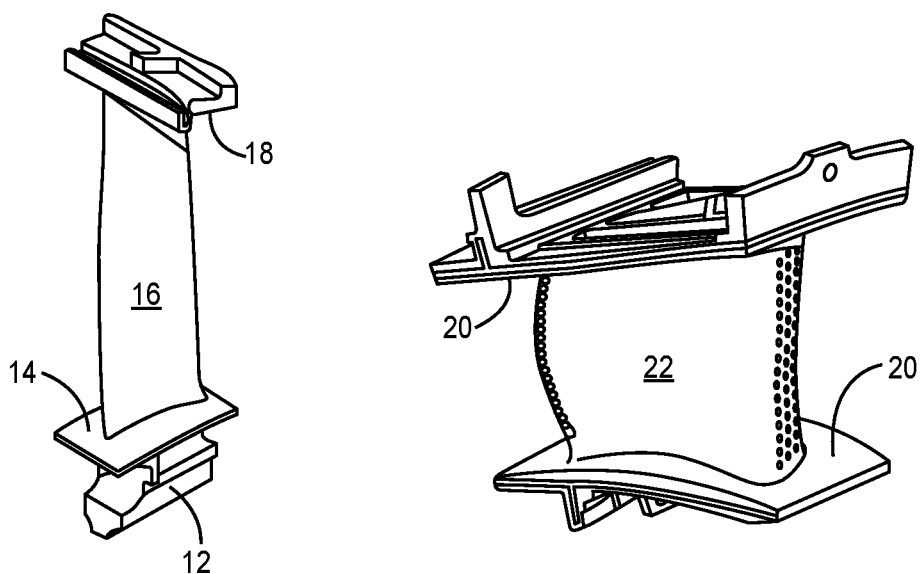
FIG. 2
(PRIOR ART)
FIG. 3
(PRIOR ART)

INSERTION OF CERAMIC MEMBERS FOR GAS PATH ENDWALL CONTOURING

BACKGROUND

The present disclosure relates generally to the manufacture of fiber-reinforced ceramic matrix composite (CMC) components and, more particularly, to CMC airfoil endwalls for use in a gas turbine engine.

Fiber-reinforced CMCs have been developed for the manufacture of components that are exposed to high temperatures, corrosive environments, and mechanical stress. CMCs are of particular interest in the aerospace industry and their use has been adopted for high temperature aircraft applications, including, but not limited to, gas path endwalls for blades and vanes of a gas turbine engine.

A typical gas turbine engine includes a turbine module with one or more turbine states for extracting energy from a stream of working medium fluid. Each turbine stage has a hub capable of rotation about an engine axis. The hub includes peripheral slots for holding one or more arrays (i.e. rows) of blades. FIG. 1 shows a typical blade of a turbine section of a gas turbine engine. Each blade includes an attachment 12, adapted to be received in a corresponding slot of a rotor disk, platform 14, and an airfoil 16. When the blades are installed in the hub the platforms 14 cooperate with each other to partially define the radially inner boundary of an annular working medium gas path. The airfoils span across the gas path so that the airfoil tips are in close proximity to a nonrotatable casing. The casing circumscribes the blade array to partially define the radially outer boundary of the gas path. Alternatively, a blade may have a radially outer platform or shroud 18 that partially defines the radially outer boundary of the gas path, as shown in FIG. 2. The radially inner platform 14 and the radially outer platform 18 (if present) partially define gas path endwalls. As used herein, "endwall" refers to a gas path boundary.

A typical turbine module also includes one or more arrays of vanes that are nonrotatable about the engine axis. As shown in FIG. 3, each vane has radially inner and outer platforms 20 that partially define the radially inner and outer gas path boundaries. An airfoil 22 spans across the gas path from the inner platform 20 to the outer platform 20. The vane platforms partially define the gas path endwalls.

During engine operation, a stream of working medium fluid flows through the turbine gas path. Near the endwalls, the fluid flow is dominated by a vortical flow structure known as a horseshoe vortex. The vortex forms as a result of the endwall boundary layer which separates from the endwall as the fluid approaches the leading edges of the airfoils. The separated fluid reorganizes into the horseshoe vortex. There is a high loss of efficiency associated with the vortex. The loss is referred to as "secondary" or "endwall" loss. As much as 30% of the loss in a row of airfoils can be attributed to endwall loss. Aerodynamic loss reduction via changes in gas path contouring at airfoil endwalls has been previously documented, for example, in U.S. Pat. Nos. 7,887,297 and 8,511,978. Endwall contouring is typically cast and/or machined in conventional metallic materials.

Modifications which allow high precision contouring are non-trivial in ceramic matrix composite layups. New methods are needed for the manufacture of CMC blades and vanes with endwall contouring.

SUMMARY

An endwall assembly for an airfoil of a gas turbine engine includes a first fiber layer, a second fiber layer forming a gas path surface, and a contoured insert disposed between the first and second fiber layers, wherein the second fiber layer conforms to a contoured surface of the contoured insert such that the contoured surface defines a geometry of the gas path surface.

A method for providing endwall contouring in the manufacture of a ceramic matrix composite airfoil endwall for a gas turbine engine includes forming a ceramic insert having a contoured surface defining a desired endwall contouring, draping a first fiber ply over the contoured surface of the ceramic insert, and densifying the assembled ceramic insert and first fiber ply. The first fiber ply conforms to a shape of the contoured surface.

A ceramic insert for an endwall of an airfoil of a gas turbine engine includes a first surface configured to face away from a gas path surface of the endwall and a second surface opposite the first surface. The second surface is contoured and configured to define a contour of the gas path surface of the endwall.

The present summary is provided only by way of example, and not limitation. Other aspects of the present disclosure will be appreciated in view of the entirety of the present disclosure, including the entire text, claims and accompanying figures.

BRIEF DESCRIPTION OF THE DRAWINGS

FIG. 1 is a view of a prior art turbine engine blade having a single endwall.

FIG. 2 is a view of a prior art turbine engine blade having two endwalls.

FIG. 3 is a view of a prior art turbine engine vane having two endwalls.

Figure 4:
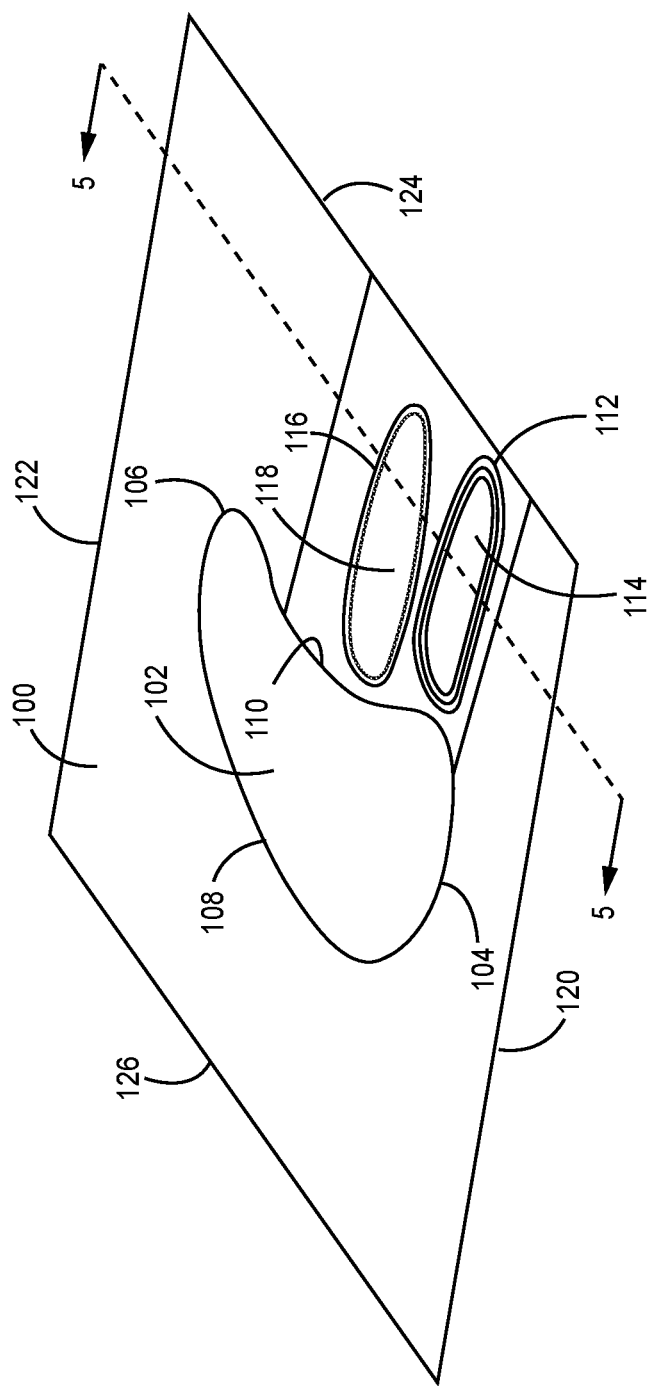
FIG. 4 is a plan view with topographic contours showing an airfoil with an elevation and trough used in combination on an endwall.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to the manufacture of airfoil endwalls of a gas turbine engine and, specifically, the manufacture of ceramic matrix composite (CMC) endwalls with gas path endwall contouring. The present disclosure is directed to a method of providing endwall contouring in a CMC layup process. The disclosed method is not limited to a particular endwall contouring geometry. As will be understood by one of ordinary skill in the art, the disclosed method can be used to provide any endwall contouring determined suitable for a particular application.

FIG. 4 is a plan view of endwall 100 with topographic contours. FIG. 4 shows endwall 100, airfoil 102, leading edge 104, trailing edge 106, suction surface 108, pressure surface 110, protrusion 112, apex 114, depression 116, base 118, endwall leading edge 120, endwall trailing edge 122, and oppositely disposed matefaces 124 and 126. Airfoil 102 projects radially from endwall 100 and includes leading edge 104, trailing edge 106, suction surface 108, and pressure surface 110. Endwall 100 has a perimeter defined by endwall leading edge 120, endwall trailing edge 122, and matefaces 124 and 126. Endwall 100 includes protrusion 112 and depression 116. Protrusion 112 projects radially from endwall 100 forming an outward extending bulge or elevation on a surface of endwall 100 with an apex 114. Depression 116 extends into endwall 100 forming a trough or recess in endwall 100 with base or deepest point 118. The endwall contouring shown in FIG. 4 is for illustrative purposes only and is not intended to depict gas path contouring suitable for reducing aerodynamic loss in operation of a gas turbine engine. While endwall 100 shows combined use of protrusion 112 and depression 116, it will be understood by one of ordinary skill in the art that endwalls formed using the disclosed method may include only a protrusion or only a depression or multiple protrusions and/or depressions. Furthermore, the disclosed method may be used to provide axisymmetric gas path contouring.

Figure 5:
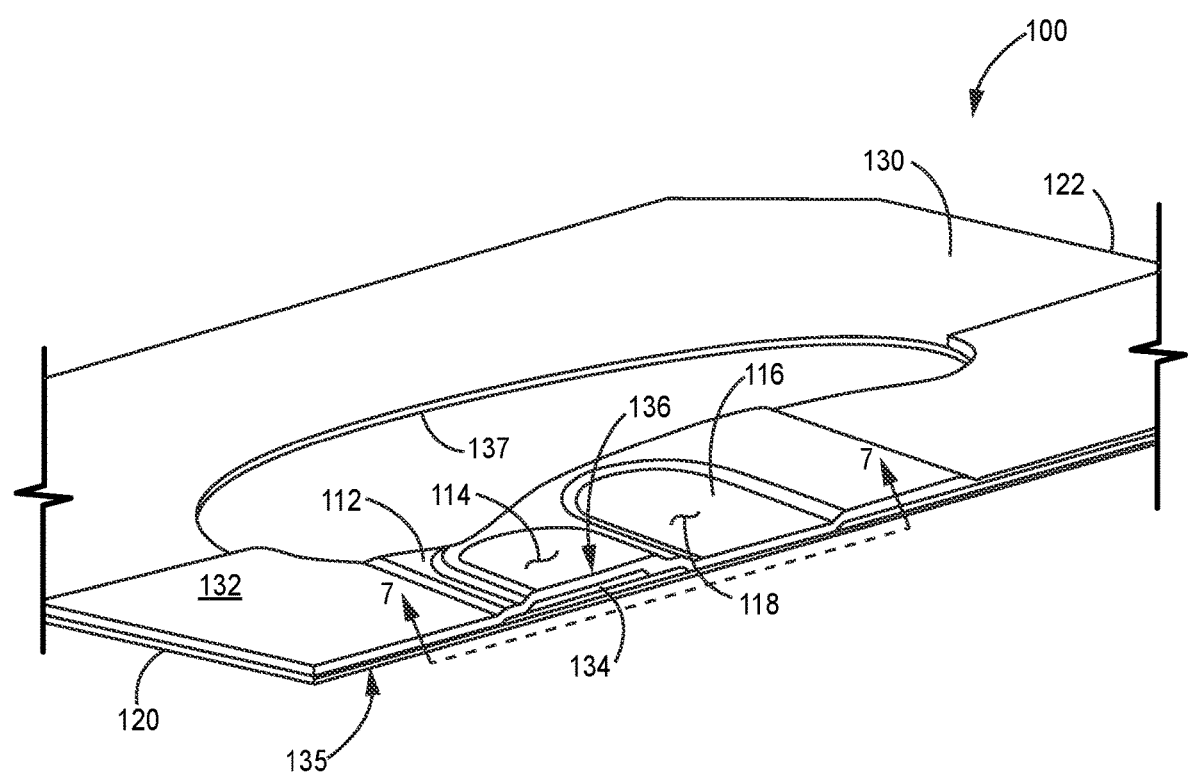
FIG. 5 is a perspective cross-sectional side view of a portion of the endwall of FIG. 4 taken along the line 5-5 of FIG. 4 and having endwall contouring defined by a contoured insert disposed between inner and outer endwall layers.

FIG. 5 is a perspective cross-sectional side view of a portion of endwall 100 of FIG. 4 taken along the line 5-5 of FIG. 4 and having endwall contouring defined by a contoured endwall insert disposed between inner and outer endwall layers. FIG. 5 shows protrusion 112, apex 114, depression 116, base 118, endwall leading edge 120, endwall trailing edge 122, inner fiber layer 130, outer fiber layer 132, contoured insert 134, inner surface 135, outer surface 136, and opening 137. A portion of outer fiber layer 132 has been removed to show inner fiber layer 130. Inner fiber layer 130 can form a base of endwall 100. Outer fiber layer 132 forms a gas path surface of endwall 100. Contoured insert 134 is disposed between inner fiber layer 130 and outer fiber layer 132. Opening 137 represents the position of airfoil 102. Opening 137 is provided for illustrative purposes only. As will be understood by one of ordinary skill in the art, airfoil 102 can be formed with endwall 100. For example, in some embodiments, outer fiber layer 132 can form a portion of airfoil 102.

Inner fiber layer 130 can have a substantially uniform thickness and can comprise one or more fiber plies provided in a stacked arrangement. As used herein, the term "substantially uniform thickness" refers to the thickness of single fiber ply (e.g., 2D woven or braided fabric sheet) forming the fiber layer, or a stack of fiber plies forming the fiber layer, which may include fiber tows of non-uniform diameter, as will be understood by one of ordinary skill in the art, but generally does not contribute to the defined gas path contouring of endwall 100 (thicknesses shown in FIG. 7). Outer fiber layer 132 can have a substantially uniform thickness and can comprise one or more fiber plies provided in a stacked arrangement. Fibers can be formed from silicon carbide (SiC) or other suitable ceramic material. Fibers can be arranged in woven or braided architectures, including, for example, 2D woven or braided fiber plies, e.g., fabric sheets, as known in the art. As discussed further herein, inner fiber layer 130 and outer fiber layer 132 can be undensified prior to assembly with contoured insert 134.

Contoured insert 134 has a non-uniform thickness with an inner surface 135 configured to face away from the gas path surface and an outer surface 136 opposite inner surface 135 and characterized by one or more protrusions and/or depressions. Contoured outer surface 136 is configured to face the gas path surface and define a contour of the gas path surface in combination with outer fiber layer 132. As illustrated, contoured outer surface 136 of contoured insert 134 defines the shape of protrusion 112 with apex 114 and depression 116 with base 118.

Contoured insert 134 can be formed of a fiber-reinforced CMC material or a monolithic ceramic body. As discussed further herein, contoured insert 134 formed of a CMC can be partially or fully densified prior to assembly with inner and outer fiber layers 130 and 132. Contoured insert 134 has contoured outer surface 136 designed for gas path endwall contouring. The shape of contoured insert 134 is not limited to the surface geometry shown. As will be understood by one of ordinary skill in the art, contoured insert 134 can be formed to provide any endwall contouring determined suitable for a specific application.

Outer fiber layer 132 can be closely draped or over contoured insert 134 such that outer fiber layer 132 conforms to contoured outer surface 136 of contoured insert 134 and such that contoured outer surface 136 defines a geometry of the endwall gas path surface.

FIG. 5 shows a portion of the endwall gas path surface provided by outer fiber layer 132. A portion of outer fiber layer 132 is omitted to show inner fiber layer 130. As illustrated, contoured insert 134 and outer fiber layer 132 are disposed on a pressure side of the airfoil with outer fiber layer 132 extending from endwall leading edge 120 to endwall trailing edge 122. As will be understood by one of ordinary skill in the art, outer fiber layer 132 fully covers inner fiber layer 130 to form the gas path surface of endwall 100. As discussed further herein, contoured insert 134 can cover any portion of inner fiber layer 130 as necessary for providing the desired endwall contouring.

Figure 6:
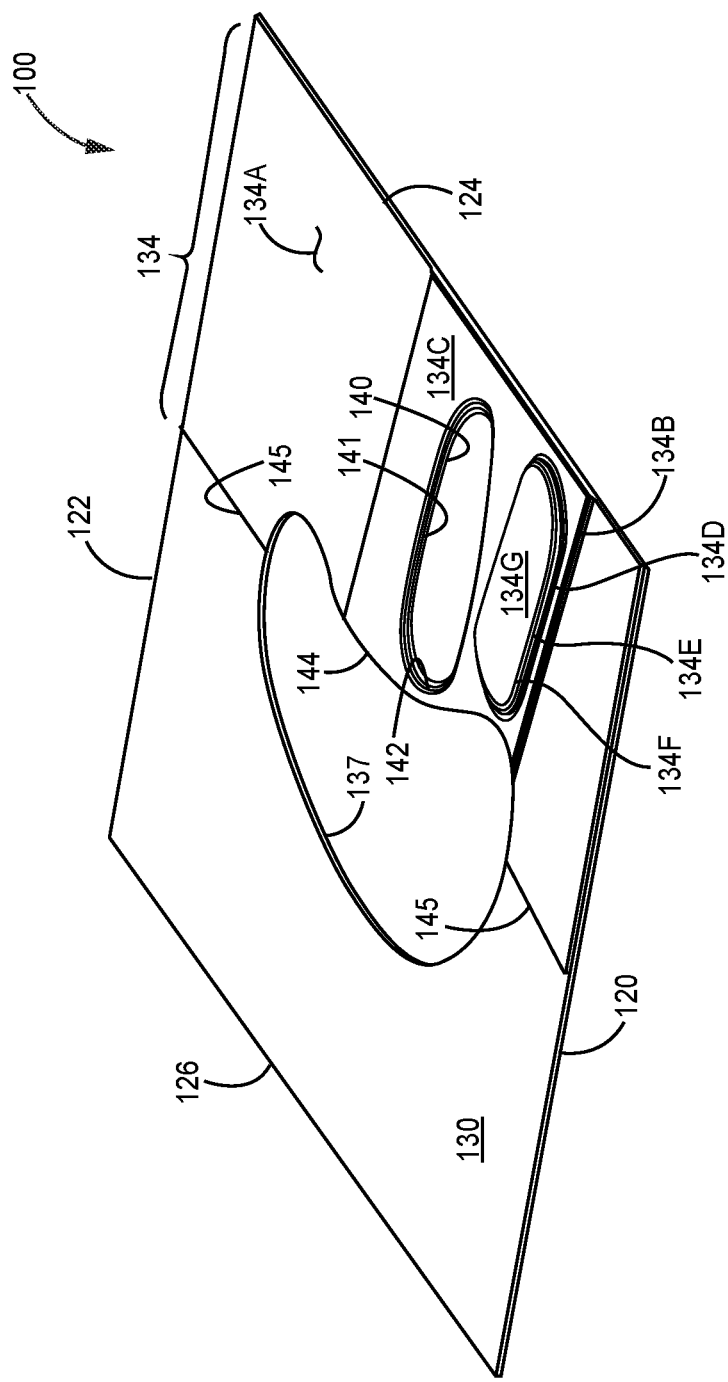
FIG. 6 is a perspective top view of the contoured insert of FIG. 5.
Figure 7:
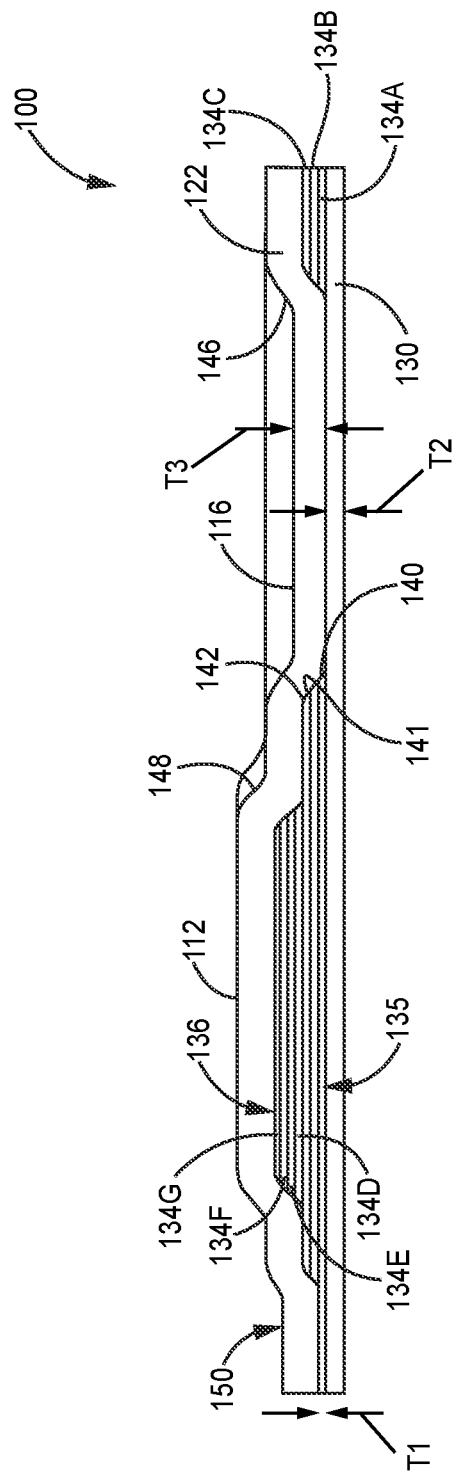
FIG. 7 is a cross-sectional side view of the endwall taken along the line 7-7 of FIG. 5.

FIG. 6 is a perspective top view of contoured insert 134 disposed on inner fiber layer 130 in a partial assembly of endwall 100. FIG. 6 shows endwall leading edge 120, trailing edge 122, matefaces 124 and 126, inner fiber layer 130, contoured insert 134, opening 137, insert layers 134A-134G, insert layer cutouts or openings 140, 141, and 142, locating feature 144, and mating edges 145. FIG. 7 is a cross-sectional view of endwall 100 taken along the line 7-7 of FIG. 5. FIG. 7 shows contoured insert 134, insert layers 134A-134G, inner surface 135, contoured outer surface 136, insert layer cutouts or openings 140, 141, and 142, inner fiber layer 130, outer fiber layer 132, protrusion 112, depression 116, tapered edges 146 and 148, nominal gas path surface 150, and thicknesses T1, T2, and T3. FIGS. 6 and 7 are discussed together herein.

As illustrated in FIGS. 6 and 7, in some embodiments, contoured insert 134 can comprise a laminated structure formed from stacked insert layers 134A-134G. Each insert layer 134A-134G can have a substantially uniform thickness T1 and can comprise one or more fiber plies provided in a stacked arrangement. The thickness T1 of each insert layer 134A-134G can vary. Fibers can be formed from silicon carbide (SiC) or other suitable ceramic material. Fibers can be arranged in woven or braided architectures, including, for example, 2D woven or braided fiber plies, e.g., fabric sheets, as known in the art. The laminated structure illustrated in FIGS. 6 and 7 is a non-limiting example of a laminated construction of contoured insert 134. It will be understood by one of ordinary skill in the art that the number, shape, and arrangement of insert layers 134A-134G will vary according to application to provide a desired endwall contouring. Contoured insert 134 is disposed between inner fiber layer 130 and outer fiber layer 132 as discussed with respect to FIG. 5.

Insert layer 134A is a base layer configured to be disposed on inner fiber layer 130. Inner fiber layer 130 can have a substantially uniform thickness T2. Insert layers 134B-134G are disposed in sequence on insert layer 134A, with insert layer 134G forming the outermost layer of contoured insert 134. Insert layer 134A in combination with outer fiber layer 132 can define the nominal gas path surface 150 of endwall 100, which can generally be defined by an arc of a circle circumscribing a longitudinal axis of the gas turbine engine and defining a circumferential contour of endwall 100. The arrangement of insert layers 134B-134G can define contoured outer surface 136 of contoured insert 134 and, in combination with outer fiber layer 132, can define the contoured gas path surface of endwall 100. Outer fiber layer 132 can have a substantially uniform thickness T3 such that the contour of the gas path surface of endwall 100 follows contoured outer surface 136 of contoured insert 134. The thicknesses illustrated in FIG. 7 are not drawn to scale nor intended to be limiting.

Insert layers 134B-134G can have different geometries such that the stacking of insert layers 134B-134G produces one or more protrusions that extend outward from the base insert layer 134A. One or more insert layer 134A-134G can include cutouts or openings to provide depressions or recesses from a surface of one or more insert layers, including the surface of the base insert layer 134A. As illustrated in FIGS. 6 and 7, insert layer 134A includes cutout 140, insert layer 134B includes cutout 141, and insert layer 134C includes cutout 142. Cutouts 140, 141, and 142 can have substantially similar shapes and can be aligned in a stacked arrangement to form a depression extending inward from insert layer 134C to inner fiber layer 130 and defining depression 116. As shown in FIG. 7, cutouts 140, 141, and 142 can increase in size outward from insert layer 134A to insert layer 134C to form a tapered edge, which in combination with outer fiber layer 132 can define tapered edge 146 of depression 116.

Insert layers 134E-134G can be configured to form a portion of protrusion 112. Insert layers 134E-134G have substantially similar shapes but can decrease in size outward from insert layer 134E to insert layer 134G to form a tapered edge, which in combination with outer fiber layer 132 can define tapered edge 148 of protrusion 112. As shown in FIG. 7, a nominal surface 150 can be defined by outer fiber layer 132 disposed directly on insert layer 134A. Protrusion 112 extends outward from nominal surface 150, following a contour of stacked insert layers 134B-134G. Depression 116 extends inward from nominal surface 150, following a contour of cutouts 140, 141, and 142 formed in insert layers 134A, 134B, and 134C, respectively.

Base insert layer 134A can provide support for insert layers 134B-134G, set a nominal gas path surface for endwall 100, and help correctly locate contoured insert 134 on inner fiber layer 130 with respect to airfoil 102. Base insert layer 134A can include multiple fiber plies with cutouts 140 in applications where deep depressions in the endwall gas path surface are required.

The shapes and arrangements of insert layers disposed on base insert layer 134A (e.g., insert layers 134B-134G) can vary according to the application. Any number of insert layers can be provided in a stacked arrangement on base insert layer 134A and can have any geometry to provide protrusions of a desired height and shape. Furthermore, multiple groups of insert layers provided in stacked arrangements can be disposed on base insert layer 134A to form multiple protrusions on the endwall gas path surface. Similarly, any insert layer can include multiple cutouts to form multiple depressions on the endwall gas path surface. Edges of insert layers can be aligned or significantly aligned to provide steep walls of protrusions or depressions or can be significantly offset to provide gradual changes in elevation.

One or more contoured inserts 134 can be provided in a single endwall assembly. In some embodiments, use of multiple contoured inserts 134 may be preferable for ease of manufacture. Each contoured insert 134 can be configured with locating features 144 to ensure proper assembly. For example, each contoured insert 134 can have a locating feature 144 corresponding to a contour or position of airfoil 102. As illustrated in FIG. 6, contoured insert 134 can be a first contoured insert configured to be disposed on a first side of airfoil 102 having an outer perimeter with a contoured portion (locating feature 144) corresponding to a suction side surface of airfoil 102 (illustrated by opening 137). A second contoured insert (not shown) can be configured to be disposed on the opposite side of endwall 100 and airfoil 102, having an outer perimeter with a contoured portion (locating feature) corresponding to a pressure side surface of airfoil 102 (illustrated by opening 137). Contoured inserts 134 can additionally include one or more mating edges 145 having a geometry configured to mate with a corresponding mating edge of an adjacent contoured insert.

In alternative embodiments, contoured insert 134 can be formed of a monolithic ceramic or a 3D woven fiber-reinforced CMC of desired shape. As discussed further herein, contoured insert 134 can be formed as a unitary body separately from other portions of endwall 100 and airfoil 102 and subsequently assembled therewith. In some embodiments, it may be desirable to provide adjacent endwalls of uniform size and configuration with different gas path contouring. This can be accomplished readily in a CMC layup process by providing prefabricated contoured inserts of different geometry.

Figure 8:
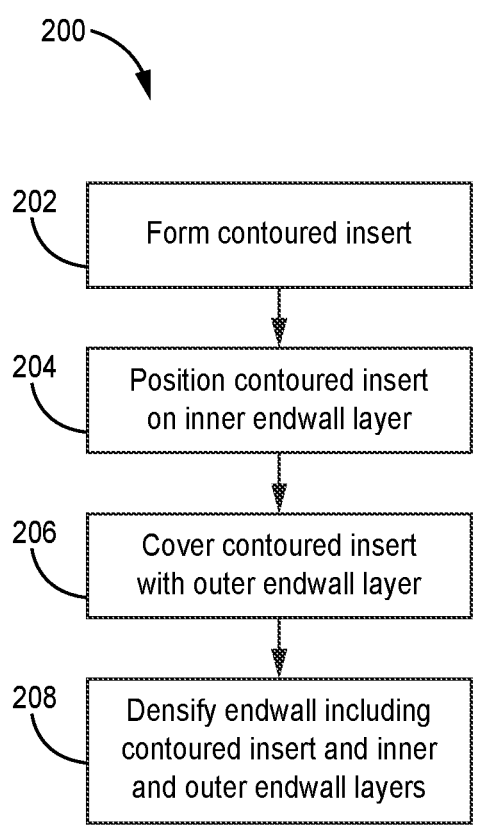
FIG. 8 is a flowchart of a method for providing endwall gas path contouring in the manufacture of a CMC airfoil endwall.

FIG. 8 is a flowchart of method 200 for providing endwall gas path contouring in the manufacture of a CMC airfoil endwall. In step 202, a contoured insert having a contoured surface defining a desired gas path endwall contouring is formed. A fiber preform of the contoured insert can be formed by stacking one or more groups of fiber plies of desired shapes on a base ply using a known fiber layup process. Each fiber ply can have a substantially uniform thickness. As previously discussed, the base fiber ply (e.g., insert layer 134A) and any fiber ply disposed thereon can include one or more cutouts (e.g., cutout 140). Fiber plies can have any shape needed to provide the desired gas path endwall contouring. Fiber plies can be cut to a desired shape using any known cutting techniques or tools. Multiple fiber plies can be cut together. Patterns can be used to cut and assemble fiber plies into shapes providing a desired surface contouring. Fiber plies can include a tackifier as known in the art to stabilize the fiber plies and assembled preform layup.

Following layup, the fiber preform of the contoured insert can be fully or partially densified with a matrix material, such as SiC, as known in the art to produce the contoured insert. Densification can be achieved using CVI, polymer infiltration and pyrolysis, slurry infiltration, melt infiltration, and combinations thereof as known in the art. Densification can be carried out until the resulting CMC contoured insert has reached a desired residual porosity. Prior to densification, one or more fiber interface coatings (e.g., boron nitride) can be applied to fibers as known in the art. Additional finishing processes, as known in the art, may be conducted following densification to smooth portions of the contoured surface or further define contours, if necessary.

In an alternative embodiment, the contoured insert can be formed from a 3D woven fiber preform having the desired contoured surface. The 3D woven fiber preform can be partially or fully densified with a ceramic matrix as described above. In yet another embodiment, a monolithic ceramic contoured insert can be cast having the desired contoured surface.

Multiple contoured inserts can be formed according to the above methods for each endwall. Each contoured insert can have a different contoured surface and can be configured to form a different portion of the endwall gas path surface.

In step 204, one or more contoured inserts are disposed on an inner fiber layer configured to form an inner surface of the endwall (opposite the gas path). As previously described, the inner fiber layer can have a substantial uniform thickness and can comprise one or more fiber plies. The one or more contoured inserts can be positioned on the inner fiber layer using one or more locating features, as previously described, to ensure proper arrangement in the endwall. In embodiments having more than one contoured insert, contoured inserts can include edges having a geometry configured to mate with an adjacent contoured insert. Mating edges can provide a substantially uniform or otherwise desired transition between adjacent contoured inserts and can additionally ensure proper placement of contoured inserts in the endwall.

In step 206, an outer fiber layer, as previously described, is positioned on or draped over the contoured surface of the contoured insert. The outer fiber layer forms the gas path surface of the endwall and can comprise one or more fiber plies. The outer fiber layer can have a substantially uniform thickness and substantially conforms to the contoured surface of the contoured insert, such that the contoured surface of the contoured insert substantially defines the contours of the gas path surface of the endwall.

Both the inner and outer fiber layers can include a tackifier to stabilize the endwall assembly. Layup and sizing of the inner fiber layer, contoured insert, and outer fiber layer can be conducted in a tooling, as known in the art, to form an endwall preform.

In step 208, the endwall preform is densified with a matrix material, such as SiC, as known in the art, to produce the final endwall component. Densification can be achieved using CVI, polymer infiltration and pyrolysis, slurry infiltration, melt infiltration, and combinations thereof as known in the art. Densification can be carried out until the resulting CMC endwall has reached a desired residual porosity. In embodiments in which the contoured insert is fully densified prior to assembly in the endwall preform, densification can fill in gaps between the contoured insert and the inner and outer fiber layers including gaps formed between ends of insert fiber plies and the outer fiber layer. Prior to densification, one or more fiber interface coatings (e.g., boron nitride) can be applied to fibers of the inner and outer fiber layers as known in the art. Additional finishing processes, as known in the art, may be conducted following densification to smooth portions of the gas path contoured endwall surface or further define contours, if necessary.

Modifications which allow high precision contouring are non-trivial in CMC layups. The disclosed inserts comprised of monolithic ceramic or CMC preforms of a predefined shape can be used to provide predefined gas path endwall contouring in a CMC layup.

The embodiments disclosed herein are intended to provide an explanation of the present invention and not a limitation of the invention. The present invention is not limited to the embodiments disclosed. It will be understood by one skilled in the art that various modifications and variations can be made to the invention without departing from the scope and spirit of the invention.

DISCUSSION OF POSSIBLE EMBODIMENTS

The following are non-exclusive descriptions of possible embodiments of the present invention.

An endwall assembly for an airfoil of a gas turbine engine includes a first fiber layer, a second fiber layer forming a gas path surface, and a contoured insert disposed between the first and second fiber layers, wherein the second fiber layer conforms to a contoured surface of the contoured insert such that the contoured surface defines a geometry of the gas path surface.

The apparatus of the preceding paragraph can optionally include, additionally and/or alternatively, any one or more of the following features, configurations, and/or additional components:

In an embodiment of the preceding endwall assembly, the contoured insert can include a fiber-reinforced ceramic matrix composite.

In an embodiment of the endwall assembly of any of the preceding paragraphs, the contoured insert can be partially densified with the ceramic matrix.

In an embodiment of the endwall assembly of any of the preceding paragraphs, the second fiber layer can have a substantially uniform thickness.

In an embodiment of the endwall assembly of any of the preceding paragraphs, the contoured surface can include a protrusion and/or a depression.

In an embodiment of the endwall assembly of any of the preceding paragraphs, the contoured surface can include a nominal surface, a protrusion extending outward from the nominal surface, and a depression extending inward from the nominal surface.

In an embodiment of the endwall assembly of any of the preceding paragraphs, the contoured insert can include a locating feature corresponding to a contour or position of the airfoil.

In an embodiment of the endwall assembly of any of the preceding paragraphs, the contoured insert can be a first contoured insert and wherein the endwall assembly can further include a second contoured insert disposed between the first and second fiber layers.

In an embodiment of the endwall assembly of any of the preceding paragraphs, the contoured surface of each of the first and second contoured inserts can include a protrusion and/or a depression.

In an embodiment of the endwall assembly of any of the preceding paragraphs, the first contoured insert can be disposed adjacent to the second contoured insert and can include a first mating edge having a geometry configured to mate with a corresponding second mating edge of the second contoured insert.

In an embodiment of the endwall assembly of any of the preceding paragraphs, the first contoured insert can include a protrusion and the second contoured insert comprises a depression.

In an embodiment of the endwall assembly of any of the preceding paragraphs, the contoured insert can include a plurality of fiber layers provided in a stacked arrangement and at least partially densified with a ceramic matrix.

In an embodiment of the endwall assembly of any of the preceding paragraphs, wherein each fiber layer of the plurality of fiber layers can include one or more fiber plies.

In an embodiment of the endwall assembly of any of the preceding paragraphs, wherein the contoured insert can be a monolithic ceramic body.

A ceramic insert for an endwall of an airfoil of a gas turbine engine includes a first surface configured to face away from a gas path surface of the endwall and a second surface opposite the first surface. The second surface is contoured and configured to define a contour of the gas path surface of the endwall.

The apparatus of the preceding paragraph can optionally include, additionally and/or alternatively, any one or more of the following features, configurations, and/or additional components:

The ceramic insert can include a plurality of fiber plies densified with a ceramic matrix.

In an embodiment of any of the preceding ceramic inserts, the second surface can include a nominal surface defined by an arc of a circle and at least one of a protrusion extending outward from the nominal surface and a depression extending inward from the nominal surface.

In an embodiment of any of the preceding ceramic inserts, the second surfaces can include a protrusion and a depression.

An embodiment of any of the preceding ceramic inserts can further include a locating feature corresponding to a contour or position of the airfoil.

In an embodiment of any of the preceding ceramic inserts, the ceramic insert can be a monolithic ceramic body.

A method for providing endwall contouring in the manufacture of a ceramic matrix composite airfoil endwall for a gas turbine engine includes forming a ceramic insert having a contoured surface defining a desired endwall contouring, draping a first fiber ply over the contoured surface of the ceramic insert, and densifying the assembled ceramic insert and first fiber ply. The first fiber ply conforms to a shape of the contoured surface.

The method of the preceding paragraph can optionally include, additionally and/or alternatively, any one or more of the following features, configurations, additional components, and/or steps:

In an embodiment of the preceding method, the ceramic insert can be a fiber-reinforced ceramic matrix composite.

In an embodiment of any of the preceding methods, forming the ceramic insert can include forming a fiber preform and at least partially densifying the fiber preform with a ceramic matrix.

In an embodiment of any of the preceding methods, forming the ceramic insert can include forming a fiber preform having an outer surface having a protrusion and/or a depression.

In an embodiment of any of the preceding methods, forming the ceramic insert can include at least partially densifying the fiber preform.

In an embodiment of any of the preceding methods, the fiber preform can include a plurality of fiber layers assembled in a stacked arrangement, the plurality of fiber layers having differing shapes and/or sizes.

In an embodiment of any of the preceding methods, the plurality of fiber layers can have differing thicknesses.

In an embodiment of any of the preceding methods, each fiber layer of the plurality of fiber layers can include one or more fiber plies.

In an embodiment of any of the preceding methods, at least one fiber layer of the plurality of fiber layers can include a cutout, the cutout forming at least a portion of a depression of the fiber preform.

In an embodiment of any of the preceding methods, the plurality of fiber plies can be stacked to form a protrusion on the outer surface of the preform, wherein a shape of the plurality of fiber plies in the stacked arrangement decreases in size from an innermost fiber layer to an outermost fiber layer to form tapered walls of the protrusion.

In an embodiment of any of the preceding methods, the ceramic insert can include a plurality of fiber plies densified with a ceramic matrix.

In an embodiment of the method of any of the preceding paragraphs, the ceramic insert can be a monolithic ceramic body.

An embodiment of any of the preceding methods can further include positioning the ceramic insert between the first fiber ply and a second fiber ply, wherein the second fiber ply is densified with the first fiber ply.

In an embodiment of any of the preceding methods, the ceramic matrix composite insert can include a locating feature corresponding to a contour or position of the airfoil.

An embodiment of any of the preceding methods can further include forming at least one additional ceramic insert having a contoured surface defining a desired endwall contouring and joining the ceramic insert and the at least one additional ceramic insert. The first fiber ply can be draped over each of the ceramic insert and the at least one additional ceramic insert.

In an embodiment of any of the preceding methods, the ceramic insert can be a monolithic ceramic body.

In an embodiment of any of the preceding methods, each ceramic insert can be a fiber-reinforced ceramic matrix composite.

In an embodiment of any of the preceding methods, each ceramic insert can comprise a plurality of fiber plies.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An endwall assembly for an airfoil of a gas turbine engine, the endwall assembly comprising:
   a first fiber layer;
   a second fiber layer forming a gas path surface; and
   a first contoured insert and a second contoured insert, the first and second contoured inserts disposed between the first and second fiber layers, wherein the second fiber layer conforms to a contoured surface of the first contoured insert and the second contoured insert such that the contoured surface defines a geometry of the gas path surface;
   wherein the contoured surface of each of the first and second contoured inserts comprises a protrusion and/or a depression; and wherein the first contoured insert is disposed adjacent to the second contoured insert and comprises a first mating edge having a geometry configured to mate with a corresponding second mating edge of the second contoured insert.

2. The endwall assembly of claim 1, wherein the contoured insert comprises a fiber-reinforced ceramic matrix composite.

3. The endwall assembly of claim 1, wherein the first contoured insert comprises a fiber-reinforced ceramic matrix composite.

4. The endwall assembly of claim 1, wherein the contoured surface comprises:
   a nominal surface;
   a protrusion extending outward from the nominal surface; and
   a depression extending inward from the nominal surface.

5. The endwall assembly of claim 1, wherein the first contoured insert comprises a locating feature corresponding to a contour or position of the airfoil.

6. The endwall assembly of claim 1, wherein the first contoured insert comprises a protrusion and the second contoured insert comprises a depression.

7. The endwall assembly of claim 1, wherein the first contoured insert comprises a plurality of fiber layers provided in a stacked arrangement and at least partially densified with a ceramic matrix.

8. The endwall assembly of claim 7, wherein each fiber layer of the plurality of fiber layers comprises one or more fiber plies.

9. The endwall assembly of claim 1, wherein the contoured insert is a monolithic ceramic body.

* * * * *